United States Patent
Reed et al.

(10) Patent No.: US 9,467,720 B2
(45) Date of Patent: Oct. 11, 2016

(54) TUNING EFFICIENCY AND DELIVERY OF CONTENT

(71) Applicant: Time Warner Cable Enterprises LLC, New York, NY (US)

(72) Inventors: Thomas H. Reed, Superior, CO (US); Robert D. Taylor, Boulder, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 0 days.

(21) Appl. No.: 14/812,573

(22) Filed: Jul. 29, 2015

(65) Prior Publication Data

US 2015/0334429 A1  Nov. 19, 2015

Related U.S. Application Data

(62) Division of application No. 13/962,370, filed on Aug. 8, 2013, now Pat. No. 9,118,976.

(51) Int. Cl.
| | |
|---|---|
| *H04N 7/173* | (2011.01) |
| *H04N 21/2385* | (2011.01) |
| *H04N 21/64* | (2011.01) |
| *H04L 29/06* | (2006.01) |
| *H04N 21/214* | (2011.01) |
| *H04N 21/436* | (2011.01) |
| *H04N 21/2383* | (2011.01) |
| *H04N 21/226* | (2011.01) |
| *H04N 21/234* | (2011.01) |
| *H04N 21/434* | (2011.01) |
| *H04N 21/438* | (2011.01) |
| *H04N 21/858* | (2011.01) |
| *H04N 21/239* | (2011.01) |

(52) U.S. Cl.
CPC ...... *H04N 21/2385* (2013.01); *H04L 65/4084* (2013.01); *H04L 67/42* (2013.01); *H04N 21/2143* (2013.01); *H04N 21/2265* (2013.01); *H04N 21/2383* (2013.01); *H04N 21/23406* (2013.01); *H04N 21/4345* (2013.01); *H04N 21/4384* (2013.01); *H04N 21/43615* (2013.01); *H04N 21/64* (2013.01); *H04N 21/8586* (2013.01); *H04N 21/2393* (2013.01)

(58) Field of Classification Search
CPC .................. H04N 7/17336; H04N 7/17318
USPC ...................... 725/91–93, 114, 116
See application file for complete search history.

(56) References Cited

U.S. PATENT DOCUMENTS

| | | | |
|---|---|---|---|
| 6,061,738 A * | 5/2000 | Osaku ............... | G06F 17/30241 709/219 |
| 8,788,528 B2 | 7/2014 | Ahlander et al. | |
| 2004/0163110 A1 | 8/2004 | Won | |
| 2007/0157258 A1 | 7/2007 | Jung et al. | |
| 2007/0162945 A1 | 7/2007 | Mills | |
| 2010/0146560 A1 | 6/2010 | Bonfrer | |
| 2011/0131298 A1* | 6/2011 | Courtemanche .... | H04L 67/1095 709/219 |

* cited by examiner

*Primary Examiner* — Sumaiya A Chowdhury
(74) *Attorney, Agent, or Firm* — Chapin Intellectual Property Law, LLC

(57) ABSTRACT

In accordance with one configuration, in response to receiving a request from a client device, a server resource tunes to a corresponding channel to retrieve content conveyed on the corresponding channel. While tuning, the server resource obtains a network address of the server resource from which content in the corresponding channel will be available for retrieval by the client device subsequent to the server resource successfully tuning to the corresponding channel and buffering a portion of the content. The server resource forwards the network address to the client device for subsequent retrieval of the content.

26 Claims, 10 Drawing Sheets

TUNING EFFICIENCY AND DELIVERY OF CONTENT

RELATED APPLICATIONS

This application is a divisional patent of earlier filed U.S. Utility patent application Ser. No. 13/962,370 entitled "TUNING EFFICIENCY AND DELIVERY OF CONTENT," filed on Aug. 8, 2013, the entire teachings of which are incorporated herein by this reference.

BACKGROUND

Conventional large cable networks comprise distributed video and data facilities to deliver content in a cable network environment. In a typical cable network, content such as videos are distributed over a backbone or core network to so-called headend resources that service one or more hubs. The hubs receive and re-distribute the content to one or more distribution nodes that each, in turn, conveys the content to a service group including multiple subscribers. Typically, the subscribers in the service group are able to tune to certain channels of the shared cable network using a set-top box, cable modem, etc., to retrieve and play back desired content.

One conventional way to deliver video over a core network to the hubs is to produce a transport stream for transmission over a backbone of a network. The transport stream is typically a QAM (Quadrature Amplitude Modulation) data channel including multiple data streams. A distribution node then initiates distribution of the multiple data streams in any of multiple possible ways to subscribers in a respective service group.

BRIEF DESCRIPTION OF EMBODIMENTS

One way of making content available to subscribers is to distribute channel map information to a corresponding server resource located in a respective subscriber domain in which a subscriber resides. The server resource can be configured to facilitate distribution of content to one or more devices in the subscriber domain via distribution of data packets.

As a more specific example, a subscriber is able to select desired content from a content channel map indicating content available on a cable network environment. For example, assume that the subscriber requests content known to be available on channel 47 (as specified by a channel map). Channel 47 can correspond to a particular QAM broadcast channel on which a server resource receives the content. In such an instance, in response to a selection of the channel 47 by a subscriber, the client device forwards the request for content available on channel 47 to the server resource.

In response to receiving the request for content on channel 47 from the client device, the server resource maps the channel 47 as specified by the request to a corresponding URL (Uniform Resource Locator). The server resource forwards the URL for subsequent use by the client device to retrieve the requested content. The URL can specify a network address from which the requested content will be available to the subscriber in the subscriber domain.

Subsequent to receiving the URL, a respective media player application in the client device then uses the received URL as a basis from which to retrieve segments of the content (available on channel 47) for consumption. For example, in accordance with input from the subscriber, via a media player application in the client device, the client device forwards a request for content again to a network address as specified by the URL.

In response to receiving the request for data at the network address as specified by the URL, the server resource then tunes to channel 47 (i.e., the requested content) to buffer the requested content received on channel 47. Thus, the server resource tunes to the appropriate channel of content after receiving the request via the assigned URL. Subsequent to buffering the content received on channel 47, the server resource then delivers the requested content as received over channel 47 to the requesting client device as data packets.

The manner of distributing requested content as discussed above suffers from deficiencies. For example, there is typically a substantial delay between a time that a respective subscriber requests content (such as selection of channel 47) and a subsequent time that the selected content is delivered to the client. For example, first, the client device must obtain an appropriate URL from which to retrieve content. Thereafter, the client device must use the URL to request that the server resource to tune to an appropriate channel to retrieve requested content. Tuning to the appropriate channel (channel 47 in the above example) upon the second request (i.e., use of the URL by the subscriber) causes further time delays because the server resource is unable to deliver the requested content to the subscriber until after the tuner resource tunes to the channel and buffers the requested content for subsequent delivery.

Embodiments herein are directed to more quickly providing one or more client devices access to available content in a network environment.

More specifically, one embodiment herein includes a server resource. The server resource forwards map information to a client device in a subscriber domain. The map information includes a mapping of identities (e.g., respective titles) of available content to corresponding network addresses (URLs) from which the respective titles of available content are to be retrievable from the server resource. In one embodiment, the client device locally stores the map information and therefore does not need to communicate with the server resource or other resource to identify an appropriate URL to use to retrieve content.

One or more client devices in communication with the server resource use the appropriate network addresses (or URLs) in the map information to request different content for retrieval. For example, in response to receiving a content request directed from the client device to a specific network address (as selected from the map information) of the server resource, the server resource tunes to an appropriate channel (of multiple channels) to obtain and then buffer corresponding requested content associated with the selected network address. The appropriate channel may be a QAM (Quadrature Amplitude Modulated) channel conveying the requested content.

Thus, in accordance with one embodiment, receipt of a request for content directed to a network address of the server resource causes the server resource to tune to an appropriate channel to retrieve and buffer corresponding requested content. To accommodate the request and deliver the requested content to a requesting client device, the server resource partitions received content into data packets. The server resource produces the data packets to include a network address of the requesting computer device for delivery to the respective client device. Thus, requested content can be received as QAM data and delivered as data packets to clients a packet-switched network environment.

Pre-storage of the mapping information (such as mapping of different available content to corresponding URLs and/or network addresses) reduces a delay in the delivery of corresponding content to a requesting client device because the subscriber merely needs to use the URL to transmit a respective request (potentially from a media player application) to an appropriate network address to retrieve content. In response to receiving a request for content at a network address as specified by a respective pre-assigned URL, the server resource tunes to an appropriate channel to deliver the requested content to a user.

In accordance with another embodiment, in response to receiving a request from a client device, a server resource tunes to a corresponding channel to retrieve the requested content. During an operation of the tuning to the requested content, the server resource obtains a network address of the server resource that has been assigned for distribution of the requested content after server resource successfully tunes to the corresponding channel and buffers a portion of the content. At or around a time of controlling a tuner to receive the requested content, the server resource forwards the network address (or appropriate URL) to the client device in anticipation of the client device using the network address (or URL) to send a subsequent request to retrieve the buffered portion of the content from the server resource.

Assume in this example that the client device transmits the subsequent request for content using the network address (or URL) previously forwarded to the client. In response to receiving the subsequent request after initial tuning, the server resource transmits the buffered portion of the requested content to the client device. Accordingly, a first request from a client device for a URL to retrieve corresponding content can cause a respective server resource to tune to a respective channel and buffer requested content as well as forward an appropriate URL to be used by the client device to retrieve the requested content. Via a media player application in the client device, the client device then transmits a second request (using the appropriate URL) to retrieve the available content. Simultaneous tuning to a channel to retrieve the requested content and forwarding of the corresponding path information such as the appropriate URL reduces an amount of time needed to distribute the respective requested content to the subscriber since tuning is performed at a time of receiving the initial content request as opposed to waiting until receiving the request based on use of the URL.

These and other embodiments are disclosed in more detail below.

Note that any of the resources as discussed herein can include one or more computerized devices, computer systems, base stations, wireless communication equipment, communication management systems, workstations, handheld or laptop computers, etc., to carry out and/or support any or all of the method operations disclosed herein. In other words, one or more computerized devices or processor hardware can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device having a processor or logic, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or shortcode in one or more ROM, RAM, PROM, etc., or as an Application Specific Integrated Circuit (ASIC), etc. The software or firmware or other such configurations can be installed onto a computerized device to cause the computerized device to perform the operations as explained herein.

Accordingly, embodiments herein are directed to a method, system, computer program product, etc., that supports operations as discussed herein.

One or more embodiment includes a computer readable hardware storage medium having instructions stored thereon. The instructions, when executed by a processor (such as processor hardware), cause the processor to: forward map information to a client device, the map information mapping a respective title of available content to a corresponding network address from which the respective title of available content is assigned to be retrievable from a server resource; in response to receiving a content request directed from the client device to the corresponding network address of the server resource: i) tuning to a corresponding channel to obtain and buffer requested content as specified by the content request; and ii) delivering the buffered requested content to the client device.

Another embodiment includes a computer readable hardware storage medium having instructions stored thereon. The instructions, when executed by a processor (such as a hardware processor resource), cause the processor to: receive map information at a client device, the map information mapping a respective title of available content to a corresponding network address from which the respective title of available content is retrievable from a server resource; utilize the map information to obtain the corresponding network address associated with the respective title of content; and from the client device in communication with the server resource, transmit a request for retrieval of the respective title of available content to the corresponding network address of the server resource, the request causing the server resource to tune to a channel in which the respective title of content is conveyed.

Yet another embodiment includes a computer readable hardware storage medium having instructions stored thereon. The instructions, when executed by a processor (such as processor hardware), cause the processor to: in response to receiving a request from a client device, tune to a corresponding channel to retrieve content conveyed on the corresponding channel; obtain a network address of the server resource from which content in the corresponding channel will be available for retrieval by the client device subsequent to the server resource successfully tuning to the corresponding channel and buffering a portion of the content; and forward the network address to the client device, the network address specifying a network interface of the server resource from which to retrieve the buffered content.

Yet another embodiment includes a computer readable hardware storage medium having instructions stored thereon. The instructions, when executed by a processor (such as processor hardware), cause the processor to: transmit a first request from a client device to a server resource, the request indicating to tune to a corresponding channel to retrieve content conveyed on the corresponding channel; from the server resource, receive a network address from which the content will be made available for retrieval by the client device subsequent to the server resource successfully tuning to the corresponding channel and buffering a portion of the content; and transmit a second request from the client device to the network address of the server resource to retrieve the buffered portion of content from the server resource.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, logic, or as hardware alone such as within a processor, or within an operating system, or a within a software application, etc.

As discussed herein, techniques herein are well suited for management and storage of content. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional summary and details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

Figure 1:
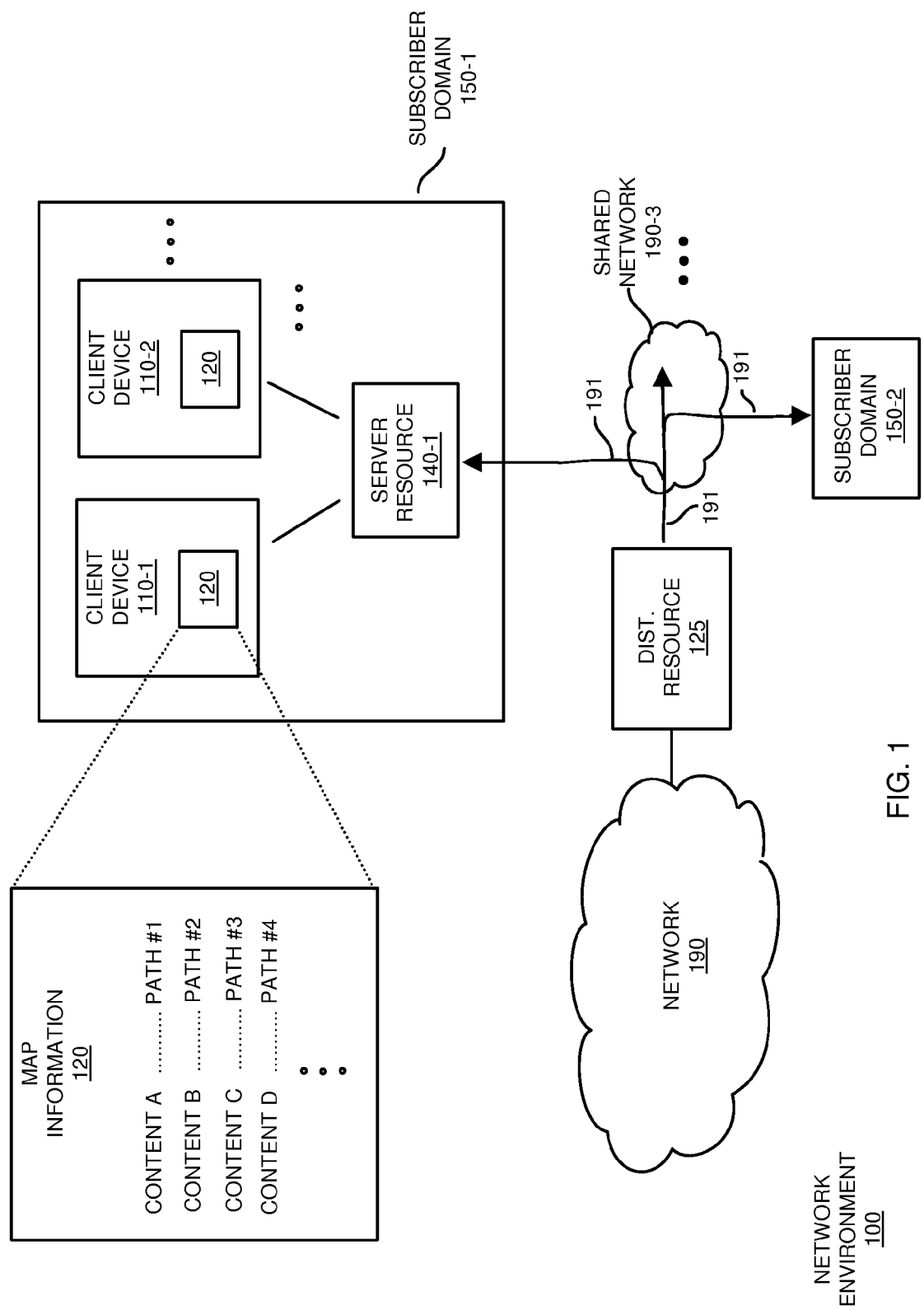
FIG. 1 is an example diagram illustrating a network environment and distribution of map information according to embodiments herein.

FIG. 1 is an example diagram illustrating a network environment and distribution of map information to retrieve different content according to embodiments herein.

As shown, network environment 100 includes network 190, distribution resource 125, shared network 190-3, shared communication link 191, and subscriber domains 150 (such as subscriber domain 150-1, subscriber domain 150-2, etc.). Network 190 can include one or more resources from which distribution resource 125 receives content for distribution to subscribers in shared network 190-3.

By way of a non-limiting example, each of the subscriber domains 150 (e.g., subscriber domain 150-1, subscriber domain 150-2, . . . ) can represent a region (such as a home environment, business environment, etc.) controlled by a respective subscriber to receive communications transmitted over the shared communication link 191 of network 190-3. Shared communication link 191 can be or include a combination of a coaxial cables, fiber optic links, wireless links, etc.

The network environment 100 can be a cable television network environment in which the distribution resource 125 transmits content to subscribers in a respective service group. For example, the distribution resource 125 can include any suitable hardware, software, etc., to receive or retrieve different types of content over network 190 and communicate such content over shared communication link 191 in network 190-3 to subscriber domains 160.

As mentioned, the distribution resource 125 can be configured to transmit different content to subscriber domains over one or more channels. In one non-limiting example embodiment, a content management resource such as server resource 140-1 tunes to the channels to retrieve respective content.

Content can be transmitted from distribution resource 125 over shared communication link 191 in any suitable manner. For example, the distribution resource 125 can be configured to: transmit content over the shared communication link 191 in one or more broadcast channels, transmit content in one or more video on-demand channels (such as switched digital video channels), transmit content as one or more over-the-top content channels such as via Internet connections, one or more client-server channels, etc.

In the case of broadcast content, each of the subscriber domains 160 receives the respective broadcast channel transmitted over shared communication link 191. Each subscriber domain can selectively tune to the respective broadcast channel to consume (e.g., playback, store, etc.) respective content conveyed thereon.

In the case of video on demand content, each of the subscriber domains 160 can select content for retrieval as switched digital video. The subscriber domain tunes to a corresponding switched digital video channel transmitted over the shared communication link 191 to consume (e.g., playback, store, etc.) respective content.

In the case of over-the-top content, each of the subscriber domains 160 can retrieve content transmitted as one or more streams of data packets specifically addressed to a requesting client device in a subscriber domain. The subscriber domain tunes to an appropriate data channel transmitted over the shared communication link 191 to consume (e.g., playback, store, etc.) respective content.

Note that each respective subscriber domain 160 may extend beyond a particular region such as a home environment. For example, a user may operate a respective playback device (that is sometimes used in the home) in a publicly accessible WiFi network external to the home environment. In such an instance, the subscriber domain as discussed herein may extend to the playback device operated by the user outside of the immediate home environment.

As mentioned, in one embodiment, the distribution resource 125 (distribution node) distributes content to subscribers in network 190-3 over shared communication link 191. In certain instances, in a reverse direction, note that each subscriber domain 150 can communicate in a reverse direction over shared communication link 191 of network 190-3 to communicate and/or convey content to distribution resource 125. Accordingly, if desired, the communication link 170 and respective resources in network environment 100 can support two-way communications.

Each subscriber domain 160 can include one or more playback devices. For example, as shown, subscriber domain 150-1 can include client devices 110 (e.g., client device 110-1, client device 110-2, etc.). Client devices 110 can be any type of communication or processing device such as a set-top box, computer device, television, personal computer, mobile computer device, mobile device, personal digital assistant, touch pad device, display screen, wireless phone, wireless mobile device, Apple™ device, etc.

Each subscriber domain can include a server resource to distribute content to client devices in a subscriber domain. For example, subscriber domain 150-1 includes server resource 140-1. The physical communication layer between each of the client devices 110 can be any suitable media such as a hard-wired connection, wireless connection, etc.

The server resource 140-1 and client devices 110 can be configured to communicate with each other via any suitable protocol. In one embodiment, the server resource 140-1 and client devices 110 communicate with each other in accordance with IP (Internet Protocol) in which data packets are generated to include a destination address of a respective device to which the data packet is directed. In addition to a destination address, each of the data packets also can include a source address of a device sending a data packet to a target device.

In one non-limiting example embodiment, the resources in a respective subscriber domain communicate with each other in accordance with DLNA (Digital Living Network Alliance) guidelines. However, any suitable communication standards can be used to distribute content according to embodiments herein.

In yet further embodiments, the server resource 140-1 (or other suitable resource in subscriber domain 150-1) forwards map information 120 to client devices 110, facilitating a more expedient delivery of content.

The map information 120 can be predetermined information mapping a respective title of available content to unique path information such as a corresponding network address or, more particularly, a predetermined URL from which the respective title of available content is assigned to be retrievable from a server resource 140-1. Server resource 140-1 can be configured to transmit the content as IP (Interference Protocol) data packets from a network address of the server resource 140-1 (as specified by the predetermined URL) to a requesting client.

In accordance with one example embodiment, the server resource 140-1 forwards the map information 120 to the client device 110-1 in response to receiving a message from the client device 110-1 requesting retrieval of the map information 120. In accordance with other embodiments, the server resource 140-1 can be configured to automatically transmit map information 120 (and corresponding updates from time to time) to each of the client devices 110.

In this example as shown, assume that the map information 120 indicates that content A is selectively available for retrieval from path #1 (path information such as a first URL); map information 120 indicates that content B is selectively available for retrieval from path #2 (path information such as a second URL); map information 120 indicates that content C is selectively available for retrieval from path #3 (path information such as a third URL); map information 120 indicates that content D is selectively available for retrieval from path #4 (path information such as a fourth URL); and so on. Via map information 120 as further described herein below, each path can include a network address and potentially additional information used by respective server resource 140-1 to facilitate distribution of corresponding content to a client device.

Figure 2:
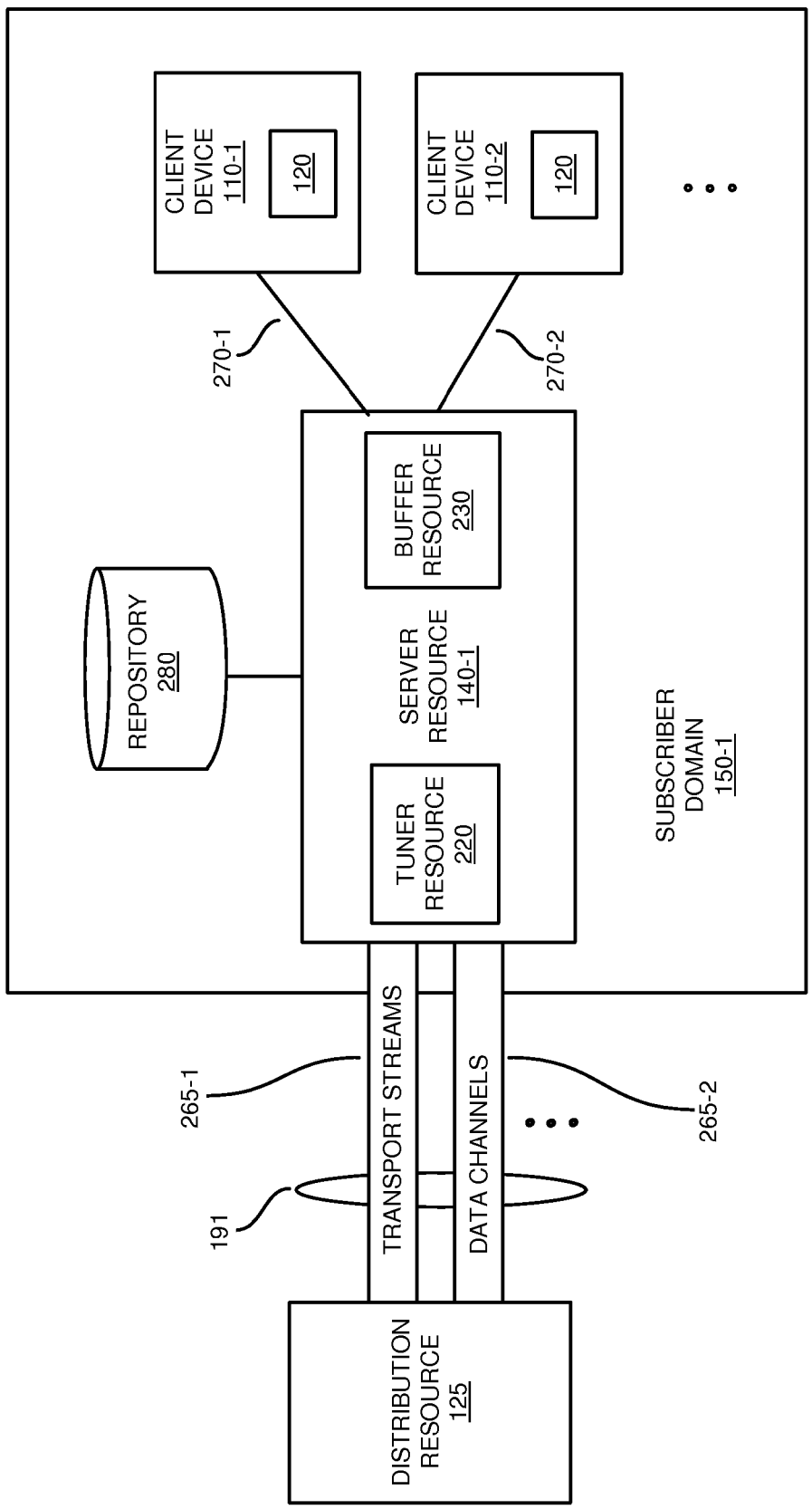
FIG. 2 is an example diagram illustrating a server resource configured to tune, buffer, and deliver requested content to one or more client devices according to embodiments herein.

FIG. 2 is an example diagram illustrating a server resource configured to tune, buffer, and deliver requested content to one or more client devices according to embodiments herein.

In this example embodiment, assume that the information associated with path #1 is the value 192.168.0.35/SL/LIVE/47 where the value "192.168.0.35" indicates the destination network address of server resource 140-1 from which to retrieve content A, the value "LIVE" indicates that the content is broadcast content, and the value "47" indicates a respective live broadcast channel on which the desired content A is retrievable from distribution resource 125. Assume that path #2 is the value 192.168.0.35/SL/VOD/365 where the value "192.168.0.35" indicates the destination network address of server resource 140-1 from which to retrieve content B, the value "VOD" indicates that the content is video on demand content, and the value "365" indicates content B to be retrieved from distribution resource 125. Assume that the path #3 is the value 192.168.0.35/SL/DVR/124 where the value "192.168.0.35" indicates the network address of server resource 140-1 from which to retrieve content C, the value "DVR" indicates that the content is available from a subscriber's storage device such as repository 280, and value "124" indicates content C to be retrieved from repository 280, and so on.

Note that in certain instances, a respective client device requesting content may provide a destination identity such as a destination network address or domain name of a resource in network 190 from which to retrieve content as over-the-top content (as opposed to the LIVE content, DVR content, VOD content, etc.). In such an instance, the destination identity specifies a resource in network 190 as a respective target as opposed to specifying the server resource 140-1 as the destination address from which to retrieve the requested over-the-top content.

As shown, the server resource 140-1 receives content over any one or more channels in transport streams 265-1 (single or multi channel transport streams) and/or data channels 265-2 (such as channels for receiving over-the-top content).

Server resource 140-1 includes tuner resource 220 and buffer resource 230. As its name suggests, tuner resource 220 tunes to an appropriate channel (e.g., a channel in transport streams 265-1, data channels 265-2, etc.) received over shared communication link 191 to retrieve requested content. Subsequent to tuning, server resource 140-1 initiates storage of retrieved content in buffer resource 230 for distribution to client devices 110 in subscriber domain 150-1.

As further shown, subscriber domain 150-1 can include repository 280 (such as a digital video recorder resource) to store data received over shared communication link 191. Server resource 140-1 has access to repository 280 for distribution of respective stored content to client devices 110.

In this example embodiment, communication link 270-1 supports communication between the server resource 140-1 and client device 110-1. Communication link 270-2 supports communication between the server resource 140-1 and client device 110-2. Each of communication links 270 can be any suitable type of physical layer such as a wireless link, hardwired link, etc.

Figure 3:
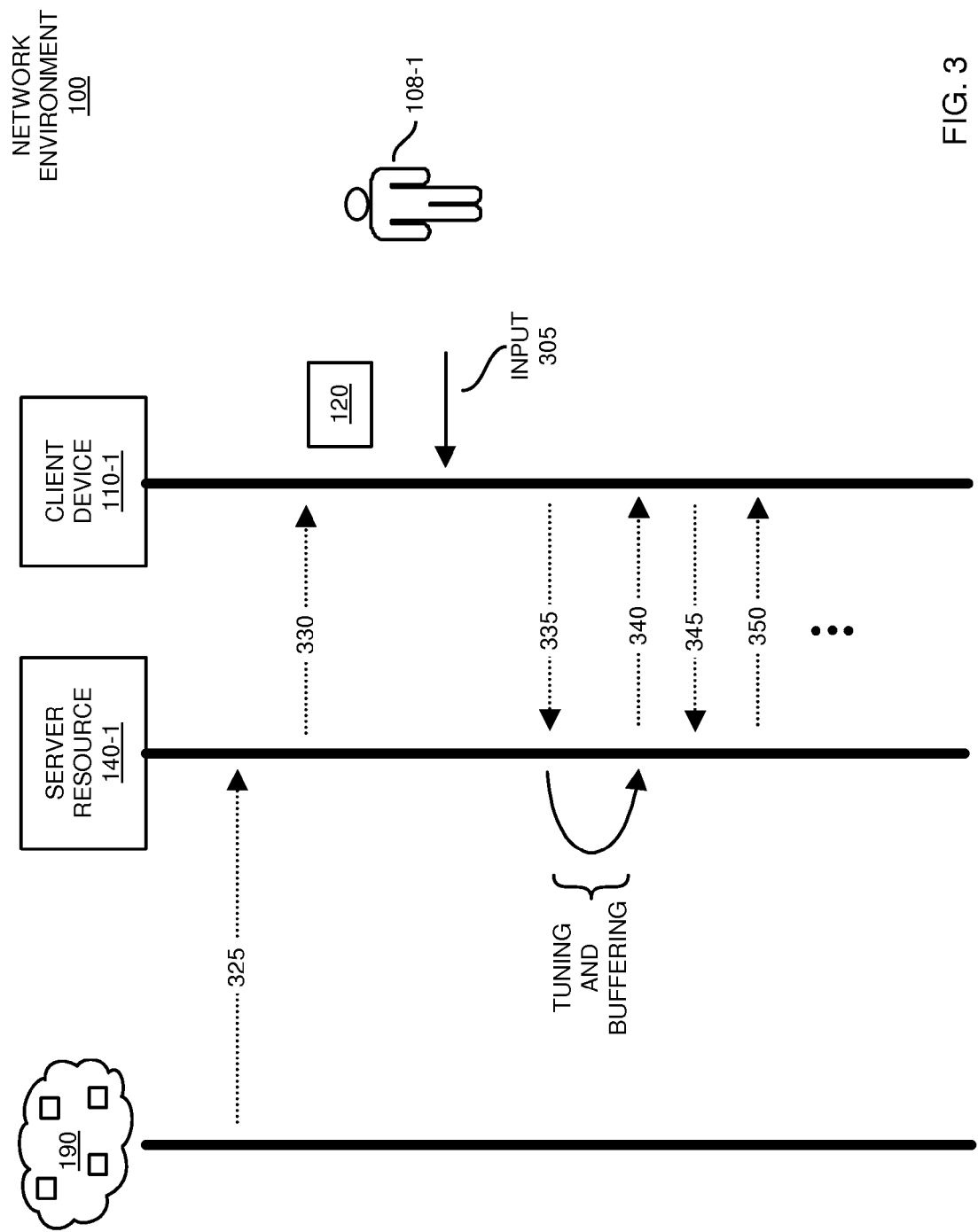
FIG. 3 is an example diagram illustrating communications in a respective network environment according to embodiments herein.

FIG. 3 is an example diagram illustrating communications in a respective network environment according to embodiments herein.

In one embodiment, the content is not available for distribution to a respective client when the client device first uses the path information in map information 120 to retrieve respective content.

In this example embodiment, server resource 140-1 receives content guide information from network 190. Content guide information indicates available content and, if available, an identity of a respective channel on which the different channels of content are available from distribution resource 125. Server resource 140-1 (or other suitable resource) generates channel map information 120 indicating different paths on which the different content can be retrieved from server resource 140-1.

In response to receiving input 305 from user 108-1 such as a request for content A available on channel 47, the client device 110-1 uses path #1 (or URL value 192.168.0.35/SL/LIVE/47) to retrieve content A. For example, the client device 110-1 transmits communication 335 (e.g., the request for content A) to the corresponding network address (such as network address 192.168.0.35) of the server resource 140-1. The communication 330 to server resource 140-1 can include suitable information such as the identity of channel 47.

In response to receiving communication 335 (e.g., the request for content A available on channel 47), the server resource 140-1 tunes to corresponding channel 47 of received transport streams 265-1 to obtain and buffer requested content A as specified by the content request. In one embodiment, the requested content A is transmitted in a multi-channel transport stream. The tuner resource 230 tunes to a particular channel in the multi-channel transport stream received over shared communication link 191 to obtain content A. The particular channel is one of multiple channels in the transport stream including the requested title of available content.

Subsequent to tuning to channel 47, the server resource 140-1 uses buffer resource 230 to buffer segments of requested content A as received on a corresponding channel transmitted from distribution resource 125 to server resource 140-1. In this example embodiment, the requested channel 47 received by server resource 140-1 from distribution resource 125 is a live broadcast channel. The content A is not buffered until after tuning in response to receiving the respective request from client device 110-1.

After buffering, the server resource 140-1 transmits one or more buffered segments of content over a respective network connection in subscriber domain 150-1 as communication 340 from the respective network address of the server resource 140-1 to the client device 110-1.

In one embodiment, as the client device 110-1 consumes the respective segments of content, the server resource 140-1 transmits successive segments of content to client device 110-1. For example, after receiving at least a first segment of requested content A via communication 340, client device 110-1 can be configured to transmit communication 345 to server resource 140-1. In response to receiving communication 345, server resource 140-1 transmits a next segment content A as communication 350 to client device 110-1.

By further way of a non-limiting example, note that the server resource 140-1 can be configured to receive requested content A over a corresponding channel transmitted from distribution resource 125 to server resource 140-1 as QAM (Quadrature Amplitude Modulated) data. In such an instance, the server resource 140-1 is configured to include a QAM tuner resource to tune to the requested channel. The multi-channel transport stream including content A can be an MPEG (Moving Pictures Expert Group) transport stream including multiple channels of different content, each of the multiple channels of different content marked with a unique identifier value.

To tune to a particular channel of a multi-channel transport stream, the server resource 140-1 uses a unique identifier value associated with the requested title of content to identify which portions of different streams of content in the multi-channel transport stream are part of a selected stream of data (i.e., content A). For example, the server resource 140-1 retrieves the requested content from allocated portions of the multi-channel transport stream that conveys segments of the requested content A. Each of the allocated portions of the multi-channel transport stream can include an appropriate packet identifier value specifying that the allocated portions belong to the corresponding channel including the requested content. The server resource 140-1 converts the segments into IP (Internet Protocol) data packets and initiates transmission of the IP data packets to the client device 110-1 from the network address 192.168.0.35.

As previously discussed, subsequent to buffering, the server resource 140-1 can be configured to initiate delivery of the segments of content as data packets over a network connection to the client device 110-1. Each of the data packets can include a destination address including a network address of the client device to route the data packets to the desired recipient (e.g., client device 110-1 in this example).

As previously discussed, note that retrieval of content is not limited to broadcast content. For example, the request for content in communication 335 can specify content B for retrieval. In such an instance, the server resource 140-1 receiving communication 335 communicates the corresponding request upstream to distribution resource 125. Distribution resource 125 allocates an appropriate channel on which the requested content is to be transmitted to the server resource 140-1. The distribution resource 125 transmits a notification to the server resource 140-1 indicating on which newly allocated channel the requested video on demand content will be transmitted. The server resource 140-1 then utilizes the tuner resource 220 to tune to the specified channel to receive and buffer segments of requested content B for subsequent distribution as data packets (from buffer resource 230) to the client device 110-1.

Accordingly, embodiments herein can include communicating a message to an upstream content distribution resource (such as distribution resource 125) that generates a multi-channel transport stream. The message can include a command to include requested content in a respective multi-channel transport stream received by the server resource 140-1.

In accordance with further embodiments, note that the content received from distribution resource 125 over shared communication link 191 can be encoded in accordance with a first encoding format. In such an instance, the server resource 140-1 can include one or more appropriate keys to decrypt the content received on the corresponding channel to produce segments. Prior to distribution to one or more client devices, the server resource 140-1 can be configured to encrypt the segments of content in accordance with a second encryption format and initiate distribution of the encrypted segments of content to the client device in response to receiving the content request.

Figure 4:
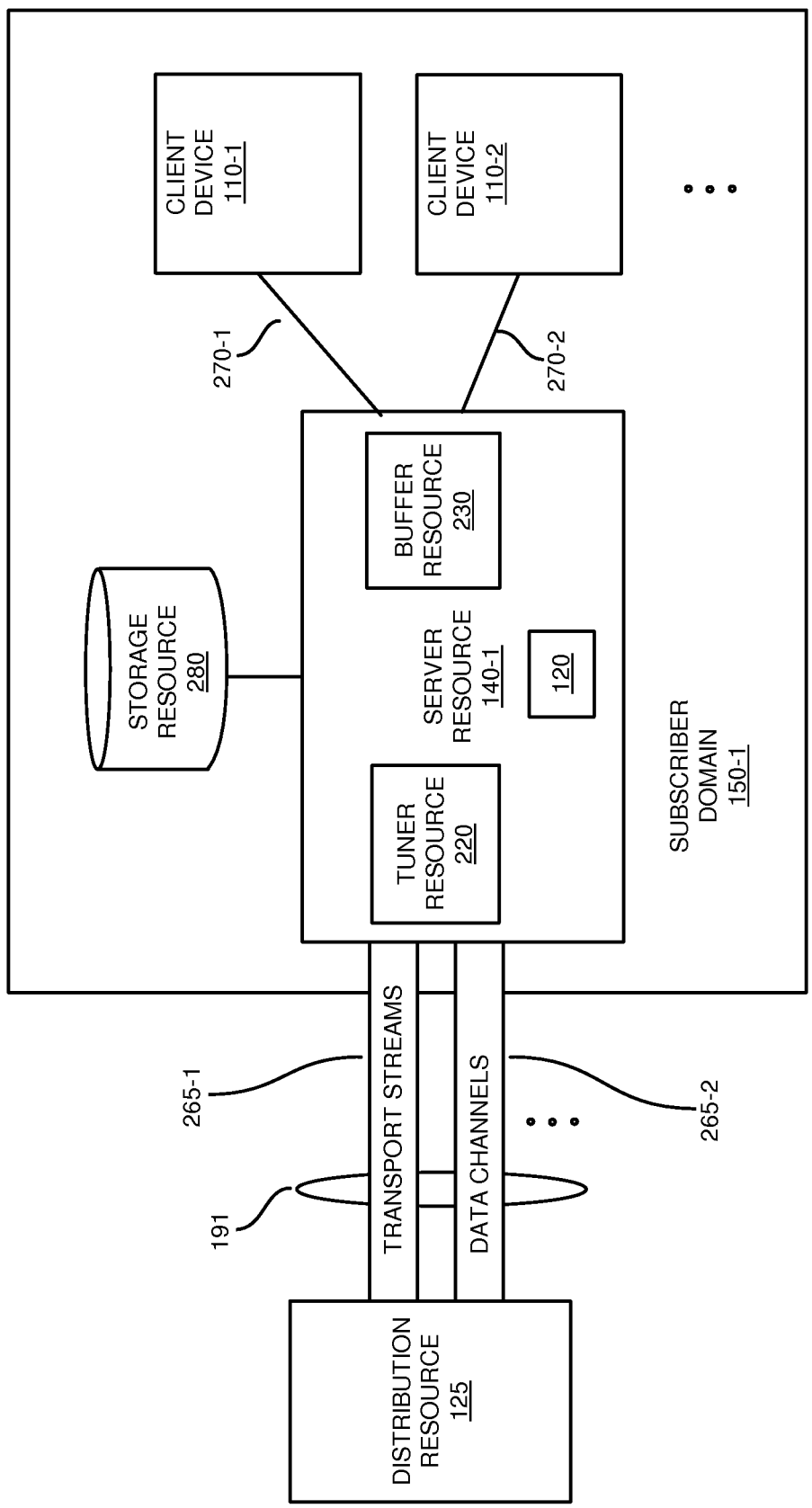
FIG. 4 is an example diagram illustrating a server resource configured to tune, buffer, and deliver requested content to one or more client devices according to embodiments herein.

FIG. 4 is an example diagram illustrating a server resource configured to tune, buffer, and deliver requested content to one or more client devices according to embodiments herein.

In this example embodiment, the server resource 140-1 does not distribute the map information 120 to client devices. Instead, server resource 140-1 has access to map information for distribution of content. The server resource 140-1 can be configured to store the map information 120 locally or remotely. Each of the client devices 110 uses an appropriate identifier value (such as a channel value, title of content, etc.) to request corresponding content.

As further discussed below, in response to receiving a request for content such as content A from a client device, the server resource 140-1: i) tunes to a corresponding channel to retrieve corresponding content, ii) uses map information 120 to obtain path information such as a URL path or network address of the server resource 140-1 from which content in the corresponding channel will be available for retrieval by the client device subsequent to the server resource successfully tuning to the corresponding channel and buffering a portion of the requested content, and iii) forwards the path information such as URL path or network address to the client device. The network address in the URL specifies a network interface of the server resource 140-1 from which to retrieve the buffered content.

In one embodiment, the server resource is an in-home server resource disposed in subscriber domain 150-1 of a respective cable network environment. The client devices 110 communicate with the server resource 140-1 (such as an in-home server resource) to retrieve content. The tuner resource 220 tunes to the selected channel amongst multiple available channels.

Figure 5:
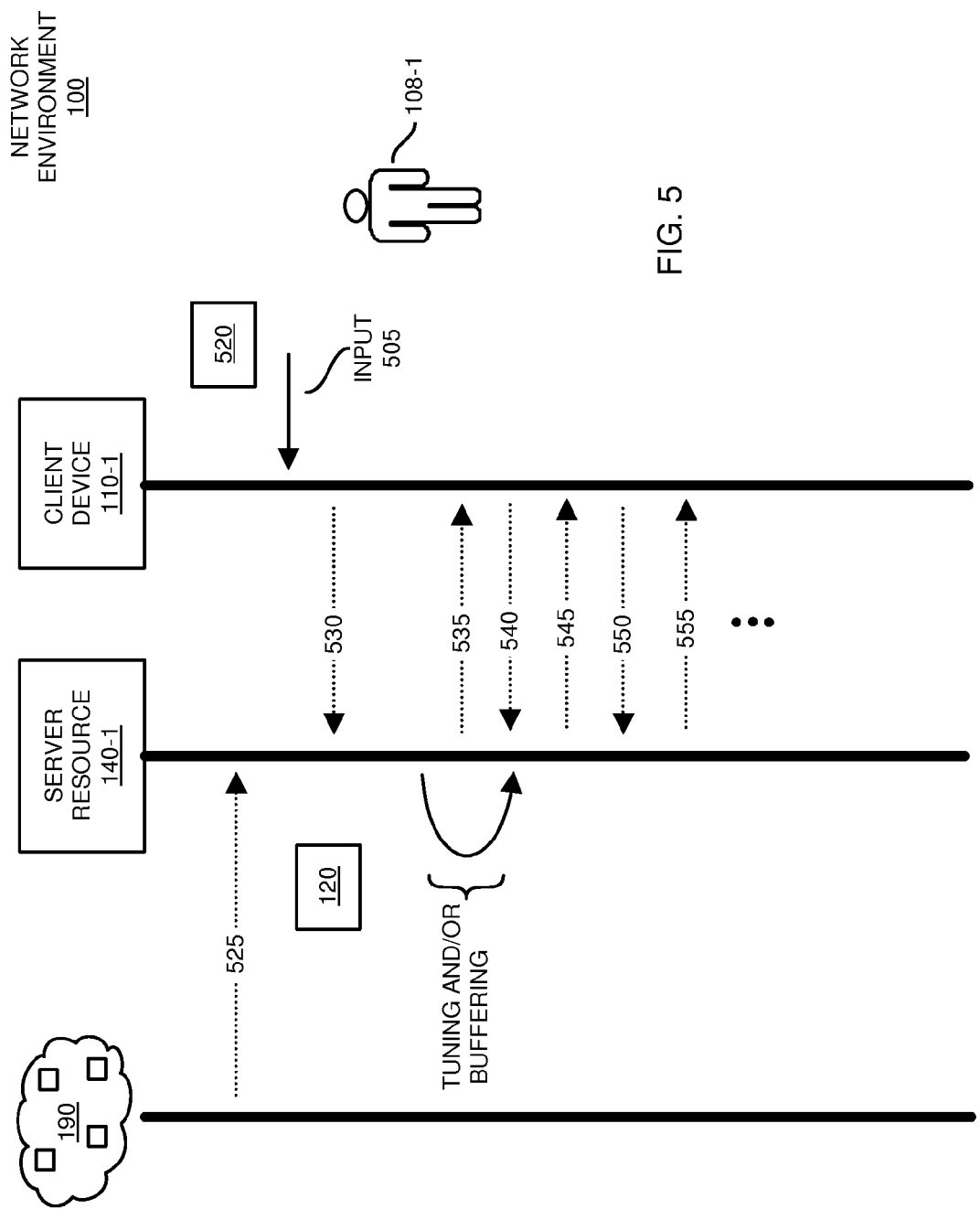
FIG. 5 is an example diagram illustrating communications in a respective network environment according to embodiments herein.

FIG. 5 is an example diagram illustrating communications in a respective network environment according to embodiments herein.

In this non-limiting example, via communication 525, the server resource 140-1 receives notification of the different content available to client devices 110 and corresponding different channels on which content can be retrieved.

In one embodiment, server resource 140-1 (or other suitable resource) notifies the user 108-1 of the available titles of content via content guide 520. Assume in this example that the user 108-1 operating client device 110-1 provides input 505 requesting retrieval of content A in content guide 520. In such an instance, the client device 110-1 generates communication 530 to server resource 140-1. Assume in this example that the communication 530 includes a request for content A from content guide 520.

At server resource 140-1, in response to receiving the request for content A via communication 530 from client device 110-1, the server resource 140-1 identifies a particular channel received on shared communication link 191 that includes the requested content. The server resource 140-1 tunes to the particular channel to retrieve the requested content.

In a manner as previously discussed, in the case that the requested content A is video on demand content, the server resource 140-1 communicates a message to upstream content distribution resource 125. The message includes a command to the upstream content distribution resource 125 to transmit the requested content to the server resource 140-1. The server resource 140-1 receives notification from the distribution resource 125 indicating on which channel to receive the requested content. The server resource 140-1 tunes to an appropriate channel to receive the requested content.

While tuning and/or buffering requested content A as specified by communication 530, the server resource 140-1 obtains path information such as a network address, URL, etc., associated with the server resource 140-1 from which content in the corresponding channel will be available for retrieval by the client device 110-1 subsequent to the server resource 140-1 successfully tuning to the corresponding channel and buffering a portion of the requested content.

In this example embodiment, assume that the server resource 140-1 utilizes map information 120 to identify that path information (such as 192.168.0.35/SL/LIVE/47) is associated with delivery of requested content A. The server resource 140-1 forwards the network address or URL (such as 192.168.0.35/SL/LIVE/47) to the client device 110-1. As previously discussed, the network address or URL information associated with requested content A can specify a network interface of the server resource 140-1 from which to retrieve the buffered content A.

In one embodiment, the server resource 140-1 receives a multi-channel transport stream including the requested content A. The multi-channel transport stream includes the corresponding channel on which content A is transmitted. In a manner as previously discussed, the content A can be conveyed as a data stream (e.g., broadcast data stream or video on demand data stream) of multiple data streams available in the multi-channel transport stream. Via the transport stream, the server resource can be configured to receive multiple channels of content broadcasted over a shared communication link 191 to a group of subscribers in a cable network environment. The channel including requested content A can be one of multiple channels received over the shared communication link 191.

To facilitate faster retrieval of content, the server resource 110-1 can be configured to forward path information such as the network address to the client device 110-1 during an operation of tuning to and/or buffering the corresponding channel in a transport stream to retrieve the requested content.

In one embodiment, the server resource 140-1 forwards the path information such as network address or URL information to the client device 110-1 in anticipation of the client device using the transmitted path information (e.g., network address, URL, etc.) to send a subsequent (second) request to the network interface to retrieve the buffered portion of the content from the server resource 140-1. By further way of a non-limiting example, the server resource 140-1 can be configured to forward the path information such as network address, URL, etc., to the client device 110-1 prior to completion of tuning to the corresponding channel and buffering a portion of the requested content. In such an instance, the client device 110-1 can receive the path information such as network address during an operation of the server resource 140-1 tuning to or buffering the corresponding channel.

In accordance with further embodiments, the client device 110-1 receives the path information such as network address, URL, etc., in communication 535 at the client device 110-1 prior to the server resource 140-1 completing tuning to a corresponding channel and buffering all or a portion of the requested content.

Via communication 540, the client device 110-1 uses the received path information such as network address, URL, etc. to retrieve content. Server resource 140-1 receives the subsequent request for content A from the client device 110-1. In one embodiment, the client device 110-1 transmits the communication 540 to the network address 192.168.0.35 associated with server resource 140-1. The subsequent request (i.e., communication 540) requests retrieval of the initially buffered portion (e.g., first portion) of the requested content A (data stream).

In response to receiving the subsequent request (communication 540), the server resource 140-1 transmits communication 545 including a buffered portion of the requested content from the appropriate network interface of server resource 140-1 to the requesting client device 110-1.

The client device 110-1 can retrieve further (successive) segments of requested content A via subsequent communications. For example, the client device 110-1 can be configured to generate communication 550 to server resource 140-1 for retrieval of a next buffered segment of content A. In response to request for a next segment, the server resource 140-1 transmits the next buffered segment of content A in communication 555 to client device 110-1. In this manner, the client device 110-1 can control a rate at which the successive buffer segments of a stream are retrieved for playback.

In a manner as previously discussed, the server resource 140-1 can be configured to transmit the segments of requested content A as one or more data packets. In one non-limiting example embodiment, the server resource 140-1 transmits the segments of content in accordance with DLNA (Digital Living Network Alliance) guidelines in which the buffered portion of content is transmitted as individually addressed data packets over a network connection from the network address (e.g., 192.168.0.35) of the server resource 140-1 to the client device 110-1.

By further way of a non-limiting example, the server resource 140-1 can be configured to receive requested content A over a corresponding channel transmitted from distribution resource 125 over shared communication link 191 to server resource 140-1 as QAM (Quadrature Amplitude Modulated) data. The server resource 140-1 is configured to include a QAM tuner resource to tune to the requested channel. The transport stream including content A can be an MPEG (Moving Pictures Expert Group) transport stream including multiple channels of different content, each of the multiple channels of different content marked with a unique identifier value.

In a manner as previously discussed, the server resource 140-1 can be configured to use a unique identifier value associated with the requested title of content to identify which portions of different streams of content in the multi-channel transport stream are part of a selected stream of data. For example, the server resource 140-1 retrieves the requested content from allocated portions of the multi-channel transport stream that conveys segments of the requested content. Each of the allocated portions of the multi-channel transport stream can include a packet identifier value specifying that the allocated portions belong to the corresponding channel including the requested content. The server resource 140-1 converts the segments received in the transport stream into IP (Internet Protocol) data packets and initiates transmission of the IP data packets to the client device 110-1 from the network address 192.168.0.35.

As previously discussed, the server resource 140-1 initiates delivery of the segments of content as data packets over a network connection to the client device 110-1. Each of the data packets can include a destination address including a network address of the client device to route the data packets to the desired recipient (e.g., client device 110-1 in this example).

As previously discussed, retrieval of content is not limited to broadcast content. For example, the request for content in communication 335 can specify content B for retrieval. In such an instance, the server resource 140-1 receiving communication 335 communicates the corresponding request upstream to distribution resource 125. Distribution resource 125 allocates an appropriate channel on which the requested content is to be transmitted to the server resource 140-1. The distribution resource 125 transmits a notification to the server resource 140-1 indicating on which channel the requested video on demand content will be transmitted. The server resource 140-1 then utilizes the tuner resource 220 to tune to the specified channel to receive and buffer segments of requested content B for subsequent distribution as data packets (from buffer resource 230) to the client device 110-1.

Accordingly, embodiments herein can include communicating a message to an upstream content distribution resource (such as distribution resource 125) that generates a respective transport stream. The message can include a command to include requested content in a respective transport stream received by the server resource 140-1.

In accordance with yet further embodiments, note that the content received from distribution resource 125 over shared communication link 191 can be encoded in accordance with a first encoding format. In such an instance, the server resource 140-1 can include one or more appropriate keys to decrypt the content received on the corresponding channel to produce segments. Prior to distribution to one or more client devices, the server resource 140-1 can be configured to encrypt the segments of content in accordance with a second encryption format and initiate distribution of the encrypted segments of content to the client device in response to receiving the content request.

Additional Embodiments

In accordance with yet further embodiments, a respective client device can be configured to communicate with the server resource 140-1 to obtain a content guide specifying different types of content (e.g., broadcast content, over-the-top content, etc.) available to the user. The content guide can be retrieved as over-the-top from one or more corresponding server resources disposed in network 190. As an example, to retrieve content guide (grid guide), the client device can communicate a message to server resource 140-1. The message transmitted to server resource 140-1 can include a destination address specifying a particular network address (of a corresponding remote server resource) in network 190 from which to retrieve the content guide.

Because the content guide request as transmitted to the server resource 140-1 is addressed to a remote server resource in network 190, the server resource 140-1 forwards the request to the appropriate destination as specified by the request message. Via communications with a specified remote server resource in network 190, the server resource 140-1 initiates retrieval of the content guide and facilitates conveyance of the requested content guide to the client device. Thus, the server resource 140-1 can operate as a pass-thru device or gateway for certain retrieval of content.

As mentioned, the retrieved content guide from which a user selects different content can specify different types of content for retrieval. For example, the retrieved content guide can indicate content available on QAM channels (such as one or more channels in transport stream 265-1) from which different content such as video on demand content, digital video recorder content, live content, etc., is available for retrieval by the respective client device. As discussed herein, the client device uses an assigned URL provided by server resource 140-1 to retrieve corresponding content. The URLs to retrieve such content can indicate a destination network address (such as 192.168.0.35) of the server resource 140-1.

Note that certain content in the respective content guide can be retrievable as over-the-top type content. In such an instance, to retrieve over-the-top content, the respective client device transmits a content request including an identifier value (such as a domain name or a destination network address) of a remote resource in network 190 from which to retrieve the corresponding content. If needed, the server resource 140-1 can be configured to communicate with a domain name server to obtain a network address (in network 190) assigned to the remote server resource. Via the obtained network address, the server resource 140-1 retrieves the requested content on behalf of the requesting client device. The server resource 140-1 then transmits the content to the client device for consumption by the client device.

Accordingly, in certain instances in which a destination address of the request message from the client device specifies a remote server resource in network 190, the server resource 140-1 can act as a gateway device (pass-thru device) in which the requested content is over-the-top at a respective server resource in network 190. In other instances, as discussed herein, the server resource 140-1 is an end device configured to tune to an appropriate QAM channel in one or more transport streams (or retrieve content from a digital video recorder) and serve the corresponding requested content to the client device.

Figure 6:
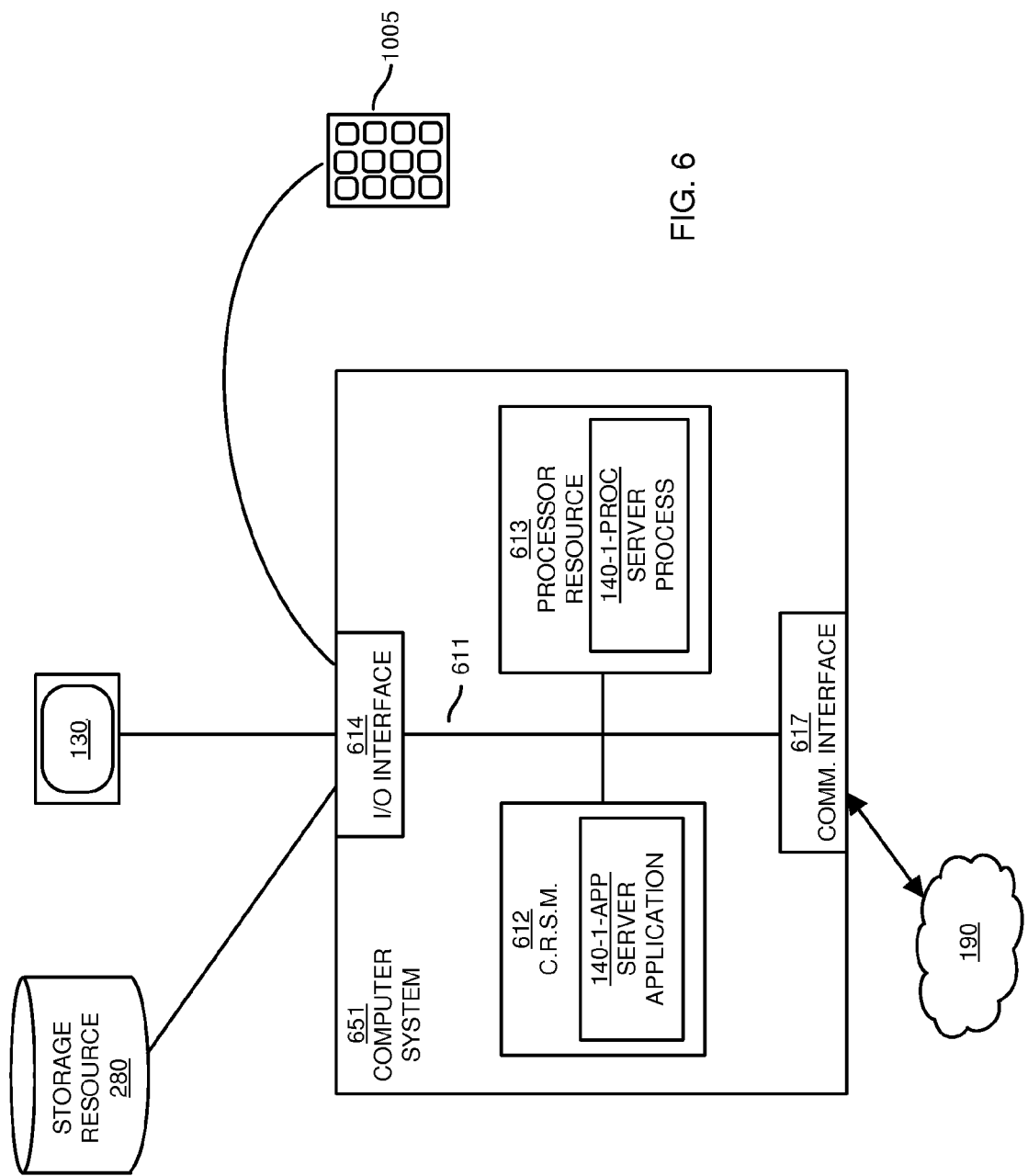
FIG. 6 is a diagram illustrating an example computer architecture in which to execute any of the functionality according to embodiments herein.

FIG. 6 is an example block diagram of a computer device for implementing any of the operations as discussed herein according to embodiments herein.

As shown, computer system 651 such as a server resource 140-1, a client device 110, etc., of the present examples as discussed herein can include an interconnect 611 that couples computer readable storage media 612 such as a non-transitory type of media (i.e., any type of hardware storage medium, hardware storage resource, etc.) in which digital information can be stored and retrieved, a processor 613 (e.g., one or more processor devices, processor hardware, processing hardware, etc.), I/O interface 614, and a communications interface 617.

I/O interface 614 provides connectivity to a repository 280 and, if present, other devices such as a playback device, display screen, keypad (input resource 1005), a computer mouse, etc.

Computer readable storage medium 612 can be any hardware storage resource or device such as memory, optical storage, hard drive, floppy disk, etc. In one embodiment, the computer readable storage medium 612 stores instructions and/or data.

Communications interface 617 enables the computer system 651 and processor resource 613 to communicate over a resource such as network 190 to retrieve and/or receive information from remote sources and communicate with other computers. I/O interface 614 enables processor resource 613 to retrieve stored information from repository 280.

As shown, computer readable storage media 612 is encoded with server application 120-1-APP (e.g., software, firmware, etc.) executed by processor 613. Server application 120-1-APP can be configured to include instructions to implement any of the operations as discussed herein.

During operation of one embodiment, processor resource 613 accesses computer readable storage media 612 via the use of interconnect 611 in order to launch, run, execute, interpret or otherwise perform the instructions in server application 120-1-APP stored on computer readable storage medium 612.

Execution of the server application 120-1-APP produces processing functionality such as server process 120-2-APP in processor 613. In other words, the server process 120-2-APP associated with processor 613 represents one or more aspects of executing server application 120-1-APP within or upon the processor resource 613 in the computer system 651.

Those skilled in the art will understand that the computer system 651 can include other processes and/or software and hardware components, such as an operating system that controls allocation and use of hardware resources to execute server application 140-1-APP.

In accordance with different embodiments, note that computer system may be any of various types of devices, including, but not limited to, a computer, a set-top box, a digital video recorder, a personal computer system, a wireless device, base station, phone device, desktop computer, laptop, notebook, netbook computer, mainframe computer system, handheld computer, workstation, network computer, application server, storage device, a consumer electronics device such as a camera, camcorder, mobile device, video game console, handheld video game device, a peripheral device such as a switch, modem, router, or in general any type of computing or electronic device. The computer system 750 may reside at any location or can be included in any suitable resource in network environment 100 to implement functionality as discussed herein.

Functionality supported by the different resources will now be discussed via flowcharts in FIGS. 7-10. Note that the steps in the flowcharts below can be executed in any suitable order.

Figure 7:
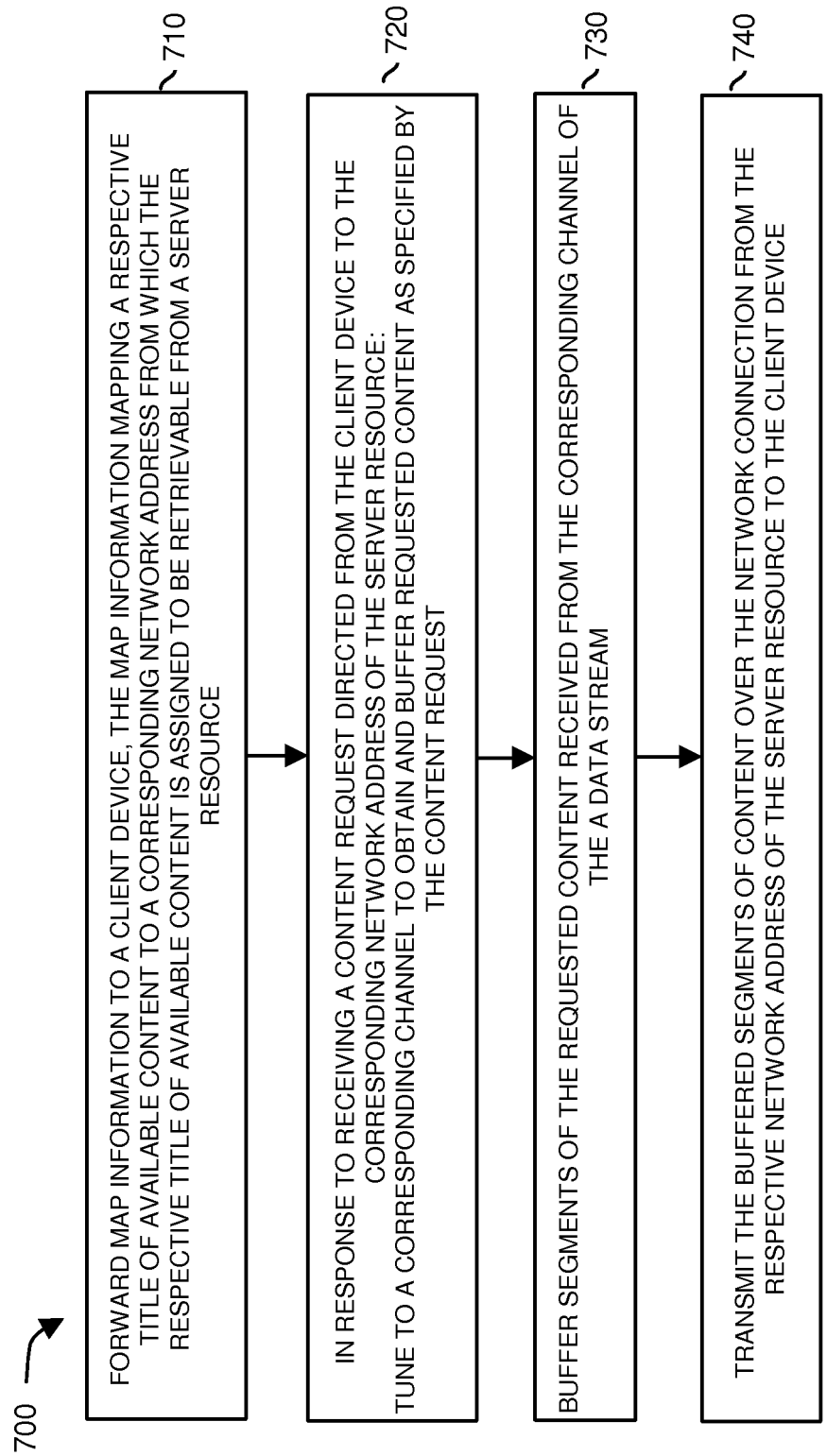
FIGS. 7-10 are example diagrams illustrating different methods of managing distribution of content in a subscriber domain according to embodiments herein.

FIG. 7 is a flowchart 700 illustrating an example method according to embodiments herein. Note that there will be some overlap with respect to concepts as discussed above.

In processing block 710, the server resource 140-1 forwards map information 120 to a client device 140-1. The map information 120 maps a respective title of available content to a corresponding network address from which the respective title of available content is assigned to be retrievable from a server resource 140-1.

In processing block 720, in response to receiving a content request directed from the client device 110-1 to the corresponding network address of the server resource 140-1, the server resource 140-1 tunes to a corresponding channel to obtain and buffer requested content as specified by the content request.

In processing block 730, the server resource 140-1 buffers segments of the requested content received from the corresponding channel.

In processing block 740, the server resource 140-1 transmits the buffered segments of content over the network connection from the respective network address of the server resource to the client device 110-1.

Figure 8:
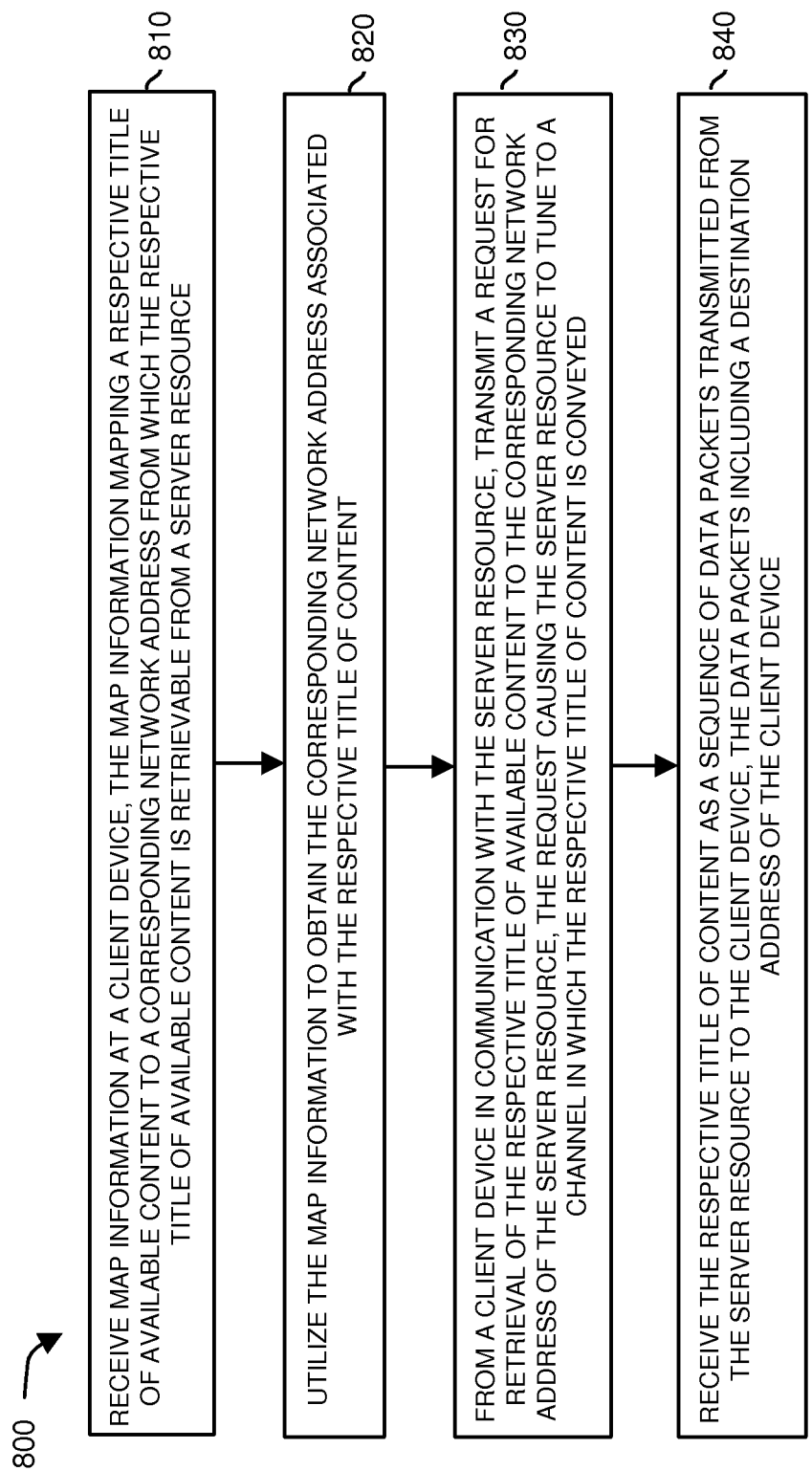

FIG. 8 is a flowchart 800 illustrating an example method according to embodiments herein. Note that there will be some overlap with respect to concepts as discussed above.

In processing block 810, the client device 110-1 receives map information 120. The map information 120 maps a respective title of available content to a corresponding network address from which the respective title of available content is retrievable from a server resource 140-1.

In processing block 820, the client device 110-1 utilizes the map information 120 to obtain the corresponding network address associated with the respective title of content.

In processing block 830, the client device 110-1 transmits a request for retrieval of the respective title of available content to the corresponding network address of the server resource 140-1. Receipt of the request causes the server resource 140-1 to tune to a channel in which the respective title of content is conveyed.

In processing block 840, the client device 110-1 receives the respective title of content as a sequence of data packets transmitted from the server resource to the client device. The data packets can include a destination address of the client device for delivery to the client device 110-1.

Figure 9:
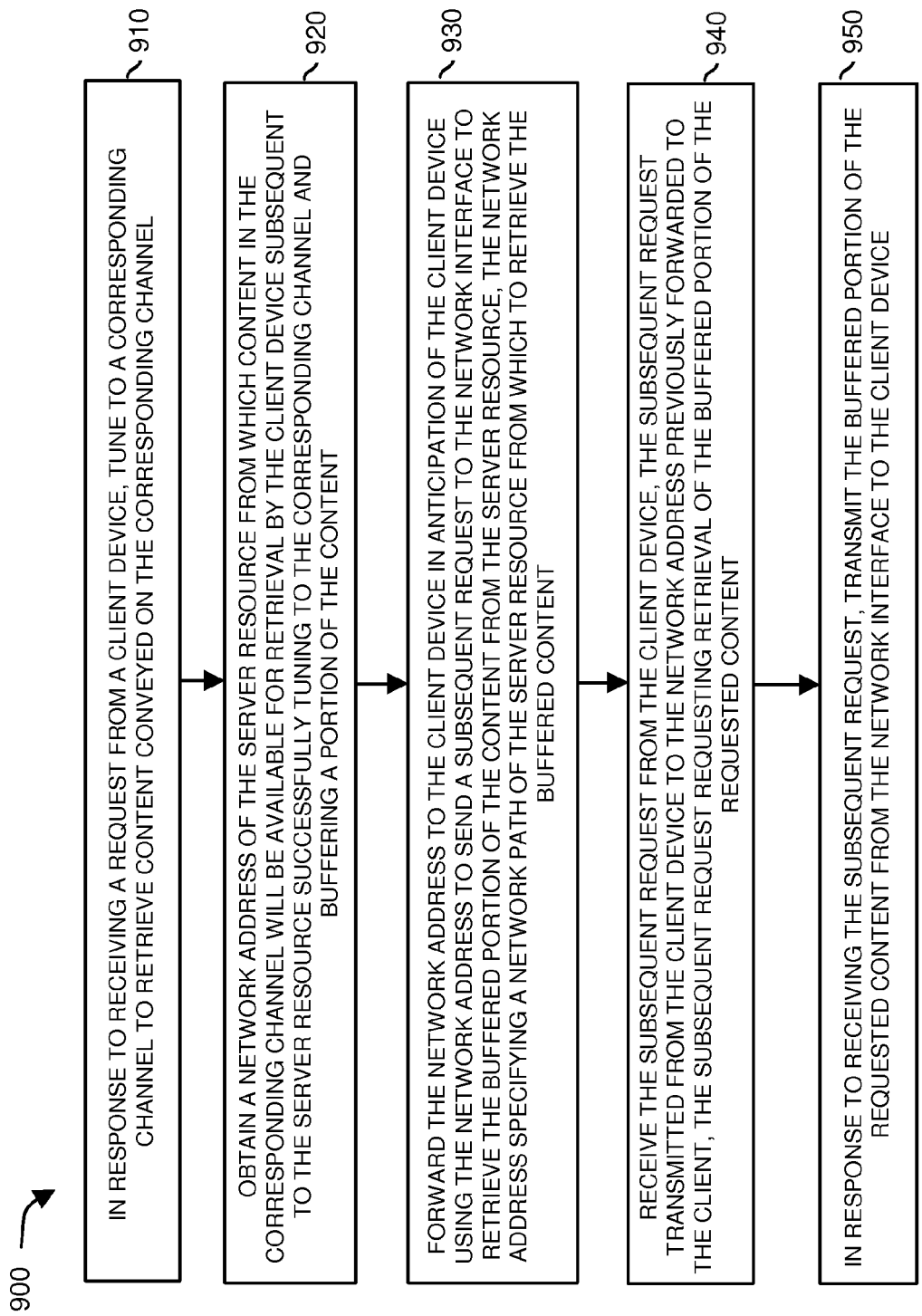

FIG. 9 is a flowchart 900 illustrating an example method according to embodiments herein. Note that there will be some overlap with respect to concepts as discussed above.

In processing block 910, in response to receiving a request from a client device 110-1, the server resource 140-1 tunes to a corresponding channel to retrieve content conveyed on the corresponding channel.

In processing block 920, the server resource 140-1 obtains a network address (assigned to the server resource 140-1) from which content in the corresponding channel will be available for retrieval by the client device subsequent to the server resource 140-1 successfully tuning to the corresponding channel and buffering a portion of the content.

In processing block 930, the server resource 140-1 forwards the network address to the client device 110-1 in anticipation of the client device 110-1 using the network address to send a subsequent request to the network interface to retrieve the buffered portion of the content from the server resource 140-1. In one embodiment, the network address specifies a network path of the server resource from which to retrieve the buffered content from the server resource 140-1.

In processing block 940, the server resource 140-1 receives the subsequent request (i.e., a second request) from the client device 110-1. The subsequent request is transmitted from the client device 110-1 to the network address previously received by the client device. The subsequent request requests retrieval of the buffered portion of the requested content at server resource 140-1.

In processing block 950, in response to receiving the subsequent request, the server resource 140-1 transmits the buffered portion of the requested content from the network interface to the client device 140-1.

Figure 10:
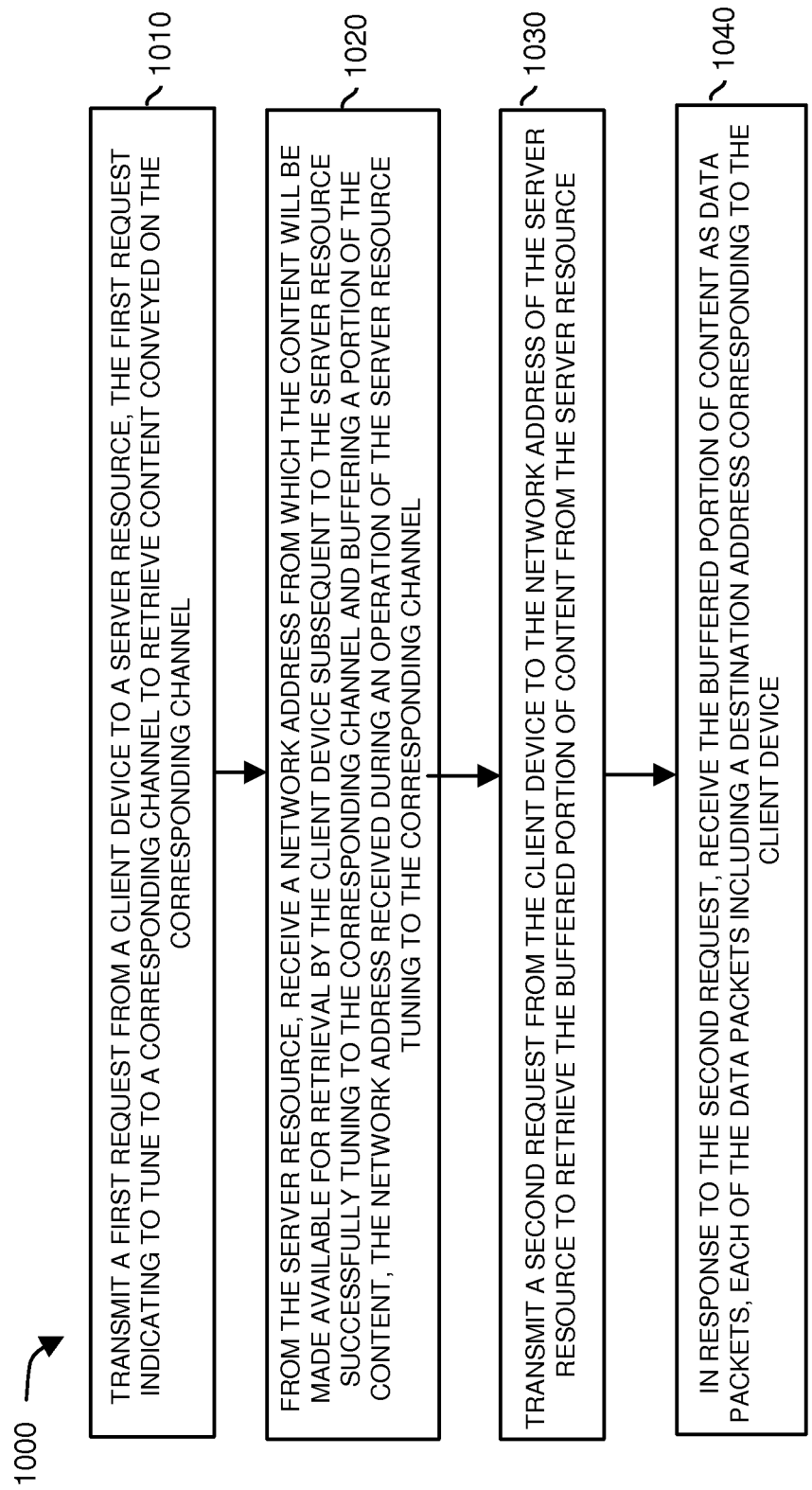

FIG. 10 is a flowchart 1000 illustrating an example method according to embodiments herein. Note that there will be some overlap with respect to concepts as discussed above.

In processing block 1010, the client device 110-1 transmits a first request from to server resource 140-1. Assume that the first request indicates to tune to a corresponding channel to retrieve content conveyed on the corresponding channel.

In processing block 1020, in response to transmitting the first request, the client device 110-1 receives a network address from which the content will be made available for retrieval by the client device subsequent to the server resource successfully tuning to the corresponding channel and buffering a portion of the content. In one embodiment, the client device 110-1 receives the network address during an operation in which the server resource 140-1 tunes to the corresponding channel.

In processing block 1030, the client device 110-1 transmits a second request to the network address of the server resource 140-1 to retrieve the buffered portion of content from the server resource 140-1.

In processing block 1040, in response to the transmitting the second request, the client device 110-1 receives the buffered portion of content as data packets. Each of the data packets can include a destination address of the client device 110-1 for proper delivery to the client device 110-1. Accordingly, in response to transmitting the second request, the client device 110-1 receives the buffered portion of content as data packets, each which includes a destination address corresponding to the client device 110-1.

Note again that techniques herein are well suited for distributing content in a network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
    via computer processor hardware at a server resource, performing operations of:
        in response to receiving a request from a client device, tuning to a corresponding channel to retrieve content conveyed on the corresponding channel;
        obtaining a network address of the server resource from which content in the corresponding channel will be available for retrieval by the client device subsequent to the server resource successfully tuning to the corresponding channel and buffering a portion of the content; and
        forwarding the network address to the client device, the network address specifying a network interface of the server resource from which to retrieve the buffered content;
    wherein the request is a first request to the server resource, the first request indicating to tune the corresponding channel, the method further comprising:
        subsequent to forwarding the network address to the client device, receiving a second request from the client device, the second request transmitted from the client device to a communication interface assigned the network address, the second request requesting retrieval of the buffered portion of the requested content from the communication interface; and
        in response to receiving the second request, transmitting the buffered portion of the requested content to the client device.

2. The method as in claim 1 further comprising:
    receiving a multi-channel transport stream, the multi-channel transport stream including the corresponding channel, the content conveyed as one of multiple data streams in the multi-channel transport stream.

3. The method as in claim 1 further comprising:
    receiving multiple channels of content broadcasted over a shared communication link to a group of subscribers in a cable network environment, the corresponding channel being one of the multiple channels received over the shared communication link; and
    storing the buffered portion of the requested content as data packets for delivery from the network address of the server resource to the client device.

4. The method as in claim 1 further comprising:
    communicating a message from the server resource to an upstream content distribution resource, the upstream content distribution resource transmitting the corresponding channel of content to the server resource, the message including a command to the upstream content distribution resource to transmit the requested content to the server resource.

5. The method as in claim 1 further comprising:
    receiving the content over the corresponding channel as QAM (Quadrature Amplitude Modulated) data; and
    initiating distribution of the received content as data packets over a packet-switched network environment to the client device.

6. The method as in claim 1, wherein retrieving the content from the corresponding channel includes:
    tuning to the corresponding channel, the corresponding channel being a transport stream conveying the content;
    retrieving the content from the transport stream as multiple segments; and
    buffering the segments of the content retrieved from the corresponding channel.

7. The method as in claim 6 further comprising:
    from the server resource, in response to receiving subsequent requests to the respective network address for retrieval of the buffered segments of content, transmitting the buffered segments of content as data packets over a network connection from the network address of the server resource to the client device.

8. The method as in claim 7 further comprising:
    prior to receiving the request:
        receiving notification of different titles of content available to client devices in a network environment and corresponding different sources from which the titles of content are available to the server resource; and
        forwarding a content guide to the client device, the content guide indicating the different titles of content available for selective retrieval by the client device, the request from the client device specifying a particular title in the content guide.

9. The method as in claim 8, wherein the server resource is an in-home server resource disposed in a subscriber domain of a cable network environment, the client device communicating with the in-home server resource to retrieve the content, the server resource including a tuner resource to tune to the corresponding channel, the tuner resource tuning to the corresponding channel amongst multiple channels in the transport stream.

10. The method as in claim 1 further comprising:
    forwarding the network address to the client device subsequent to receiving the request for content and prior to buffering the portion of content.

11. The method as in claim 1 further comprising:
    forwarding the network address to the client device during an operation of tuning to the corresponding channel to buffer the portion of the content.

12. A method comprising:
    via computer processor hardware at a server resource, performing operations of:
        in response to receiving a request from a client device, tuning to a corresponding channel to retrieve content conveyed on the corresponding channel;
        obtaining a network address of the server resource from which content in the corresponding channel will be available for retrieval by the client device subsequent to the server resource successfully tuning to the corresponding channel and buffering a portion of the content; and forwarding the network address to the client device, the network address specifying a network interface of the server resource from which to retrieve the buffered content;

receiving multiple channels of content broadcasted over a shared communication link to a group of subscribers in a cable network environment, the corresponding channel being one of the multiple channels received over the shared communication link;

storing the buffered portion of the requested content as data packets for delivery from the network address of the server resource to the client device; and wherein the server resource is an in-home server resource disposed in a subscriber domain of a cable network environment, the client device communicating with the in-home server resource to retrieve the content, the server resource including a tuner resource to tune to the corresponding channel, the tuner resource tuning to the corresponding channel amongst multiple channels in a received multi-channel transport stream.

13. The method as in claim 12, wherein the request is a first request to the server resource, the first request indicating to tune the corresponding channel, the method further comprising:

subsequent to forwarding the network address to the client device, receiving a second request from the client device, the second request transmitted from the client device to a communication interface assigned the network address, the second request requesting retrieval of the buffered portion of the requested content from the communication interface; and in response to receiving the second request, transmitting the buffered portion of the requested content to the client device.

14. The method as in claim 12 further comprising:

receiving multiple channels of content broadcasted over a shared communication link to a group of subscribers in a cable network environment, the corresponding channel being one of the multiple channels received over the shared communication link; and storing the buffered portion of the requested content as data packets for delivery from the network address of the server resource to the client device.

15. The method as in claim 12 further comprising:

communicating a message from the server resource to an upstream content distribution resource, the upstream content distribution resource transmitting the corresponding channel of content to the server resource, the message including a command to the upstream content distribution resource to transmit the requested content to the server resource.

16. The method as in claim 12 further comprising:

receiving the content over the corresponding channel as QAM (Quadrature Amplitude Modulated) data; and initiating distribution of the received content as data packets over a packet-switched network environment to the client device.

17. A method comprising:

transmitting a first request from a client device to a server resource, the first request indicating to tune to a corresponding channel to retrieve content conveyed on the corresponding channel, the server resource configured to tune to the corresponding channel to retrieve the content conveyed on the corresponding channel;

from the server resource, receiving a network address from which the content will be made available for retrieval by the client device subsequent to the server resource successfully tuning to the corresponding channel and buffering a portion of the content; and subsequent to receiving the network address at the client device, transmitting a second request from the client device, the second request transmitted from the client device to a communication interface assigned the network address, the second request requesting retrieval of the buffered portion of the requested content from the communication interface; and in response to transmitting the second request, receiving the buffered portion of the requested content at the client device.

18. The method as in claim 17, wherein the content received in the corresponding channel is content broadcasted to the server resource, the server resource receiving the corresponding channel as one of multiple channels of content broadcasted over a shared communication link to a group of subscribers in a cable network environment.

19. The method as in claim 18, wherein the server resource is an in-home server resource disposed in a subscriber domain of a cable network environment in which the client device resides, the client device communicating with the in-home server resource to retrieve the content, the server resource including a tuner resource to tune to the corresponding channel, the tuner tuning to the corresponding channel amongst multiple channels in a received multi-channel transport stream.

20. A computer system comprising:

processor hardware; and a hardware storage resource coupled to the processor hardware, the hardware storage resource storing instructions that, when executed by the processor hardware, causes the processor hardware to perform operations of:

in response to receiving a request from a client device, tuning to a corresponding channel to retrieve content conveyed on the corresponding channel;

obtaining a network address assigned to distribute the retrieved content to the client device, the network address providing the client device access to the retrieved content subsequent to the server resource successfully tuning to the corresponding channel and buffering a portion of the content; and forwarding the network address to the client device in anticipation of the client device requesting subsequent retrieval of the buffered portion of content, the network address specifying a network interface of the server resource from which to retrieve the buffered portion of content;

wherein the request is a first request to the server resource, the first request indicating to tune the corresponding channel;

subsequent to forwarding the network address to the client device, receiving a second request from the client device, the second request transmitted from the client device to a communication interface assigned the network address, the second request requesting retrieval of the buffered portion of the requested content from the communication interface; and in response to receiving the second request, transmitting the buffered portion of the requested content to the client device.

21. The computer system as in claim 20, wherein the processor hardware further performs operations of:

receiving a multi-channel transport stream, the multi-channel transport stream including the corresponding channel, the content conveyed as one of multiple data streams in the multi-channel transport stream.

22. The computer system as in claim 20, wherein the processor hardware further performs operations of:
receiving multiple channels of content broadcasted over a shared communication link to a group of subscribers in a cable network environment, the corresponding channel being one of the multiple channels received over the shared communication link; and
storing the buffered portion of the requested content as data packets for delivery from the network address of the server resource to the client device.

23. The computer system as in claim 20, wherein the server resource is an in-home server resource disposed in a subscriber domain of a cable network environment, the client device communicating with the in-home server resource to retrieve the content, the server resource including a tuner resource to tune to the corresponding channel, the tuner resource tuning to the corresponding channel amongst multiple channels in a received multi-channel transport stream.

24. The computer system as in claim 20, wherein the processor hardware further performs operations of:
communicating a message from the server resource to an upstream content distribution resource, the upstream content distribution resource transmitting the corresponding channel of content to the server resource, the message including a command to the upstream content distribution resource to transmit the requested content to the server resource.

25. The computer system as in claim 20, wherein the processor hardware further performs operations of:
receiving the content over the corresponding channel as QAM (Quadrature Amplitude Modulated) data; and
initiating distribution of the received content as data packets over a packet-switched network environment to the client device.

26. Computer-readable hardware storage having instructions stored thereon, the instructions, when carried out by processor hardware, causes the processor hardware to perform operations of:
in response to receiving a request from a client device, tuning to a corresponding channel to retrieve content conveyed on the corresponding channel;
obtaining a network address of the server resource from which content in the corresponding channel will be available for retrieval by the client device subsequent to the server resource successfully tuning to the corresponding channel and buffering a portion of the content; and
forwarding the network address to the client device, the network address specifying a network interface of the server resource from which to retrieve the buffered content;
wherein the request is a first request, the first request indicating to tune the corresponding channel;
subsequent to forwarding the network address to the client device, receiving a second request from the client device, the second request transmitted from the client device to a communication interface assigned the network address, the second request requesting retrieval of the buffered portion of the requested content from the communication interface; and
in response to receiving the second request, transmitting the buffered portion of the requested content to the client device.

\* \* \* \* \*